US010125825B2

(12) United States Patent
Stausholm et al.

(10) Patent No.: US 10,125,825 B2
(45) Date of Patent: Nov. 13, 2018

(54) HYDRAULIC TOOL

(71) Applicant: VETCO GRAY SCANDINAVIA AS, Sandvika (NO)

(72) Inventors: Jan Stausholm, Esbjerg V (DK); Youfu Chen, Stavanger (NO); Pavan Kumar Illendala, Stavanger (NO); Ashutosh Phadke, Stavanger (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 615 days.

(21) Appl. No.: 14/719,012

(22) Filed: May 21, 2015

(65) Prior Publication Data
US 2015/0337905 A1   Nov. 26, 2015

(30) Foreign Application Priority Data

May 21, 2014   (NO) .................................. 20140639

(51) Int. Cl.
*F16D 3/80*   (2006.01)
*E21B 33/038*   (2006.01)
*F16L 1/26*   (2006.01)

(52) U.S. Cl.
CPC .............. *F16D 3/80* (2013.01); *E21B 33/038* (2013.01); *F16L 1/26* (2013.01); *Y10T 29/49824* (2015.01); *Y10T 403/22* (2015.01)

(58) Field of Classification Search
CPC .......... F16D 3/80; E21B 33/038; E21B 41/04; E21B 17/08; E21B 19/16; F16L 1/26; F16L 21/06; F16L 37/62; Y10T 403/22; Y10T 29/49824; B63C 11/52

USPC ....... 403/15, 19, 31; 405/169; 166/339, 340, 166/348, 349
See application file for complete search history.

(56) References Cited

U.S. PATENT DOCUMENTS

| | | | |
|---|---|---|---|
| 5,273,376 A | 12/1993 | Ritter, Jr. | |
| 5,433,274 A | 7/1995 | Graff et al. | |
| 7,293,940 B1* | 11/2007 | Perreau-Saussine | ....................... E21B 17/1057 405/168.1 |
| 2012/0018164 A1* | 1/2012 | Tabor | .................... E21B 19/002 166/340 |

(Continued)

OTHER PUBLICATIONS

Norwegian Search Report dated Dec. 20, 2014 which was issued in connection with Norwegian Patent Application No. 20140639 which was filed on May 21, 2014.

*Primary Examiner* — Carib A Oquendo
(74) *Attorney, Agent, or Firm* — GE Global Patent Operation (57) ABSTRACT

A hydraulic tool for moving a first structural element in the axial direction in relation to a second structural element. The tool comprises a ring-shaped frame configured for insertion into a gap between an annular shoulder on the first structural element and an annular shoulder on the second structural element; and hydraulic power members fixed to and distributed along said frame, the power members being configured to exert an axial pushing force against one of said annular shoulders to thereby move said structural elements apart. The frame comprises first and second arc-shaped sections, each of which having a hinged first end and an opposite second end. The arc-shaped sections are pivotable between an open position, in which their second ends are spaced apart, and a closed position, in which their second ends are in contact with each other.

20 Claims, 6 Drawing Sheets

(56) References Cited

U.S. PATENT DOCUMENTS

2012/0273212 A1\* 11/2012 Anderson ............ E21B 33/038
166/340

\* cited by examiner

Fig 1

Prior Art

HYDRAULIC TOOL

BACKGROUND

Embodiments of the present invention relate to a hydraulic tool for moving a first structural element in the axial direction in relation to a second structural element. Embodiments of the present invention also relate to a method for releasing the frictional grip between a cam ring and a number of latching dogs which are moveably mounted in a connector body of a tieback connector.

Figure 1:
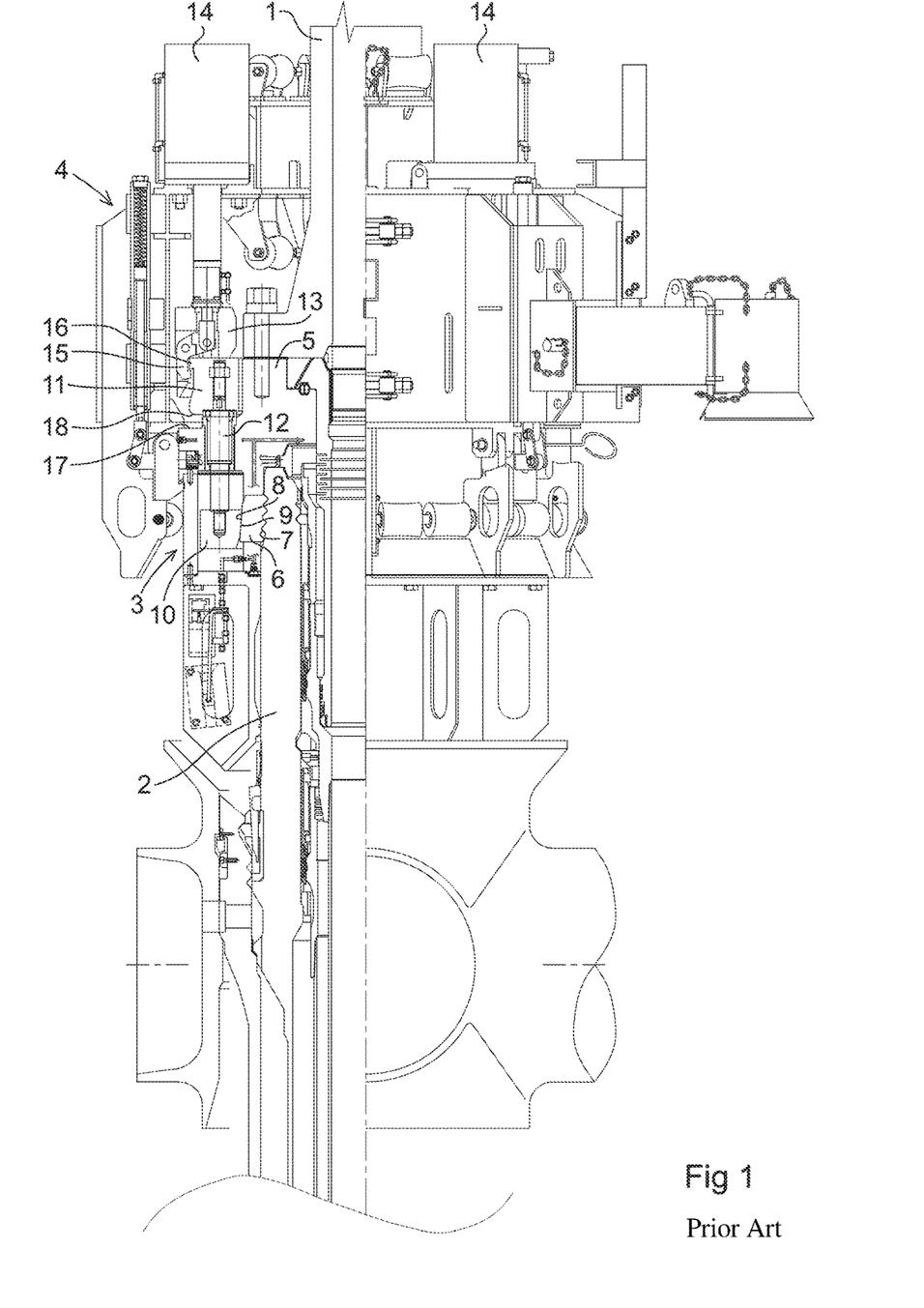
FIG. 1 is a partly cut lateral view of a tieback connector and a running and retrieval tool according to prior art.
Figure 2:
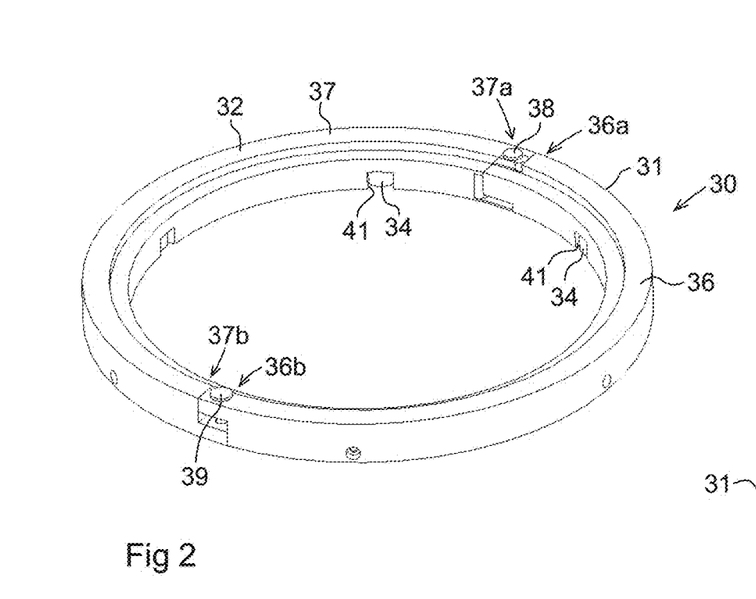
FIG. 2 is a perspective view from above of a hydraulic tool according to a first embodiment of the present invention, as seen with the ring-shaped frame of the hydraulic tool in a closed position.
Figure 3:
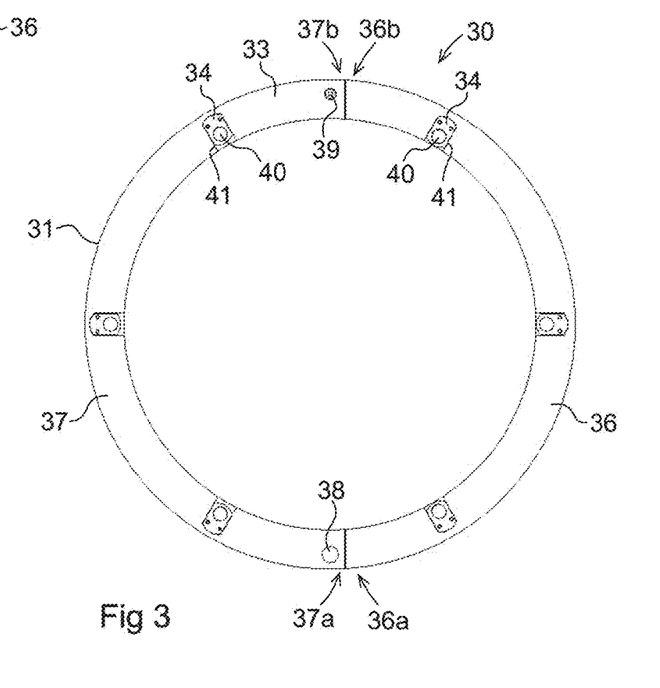
FIG. 3 is a planar view from below of the hydraulic tool of FIG. 2.
Figure 4:
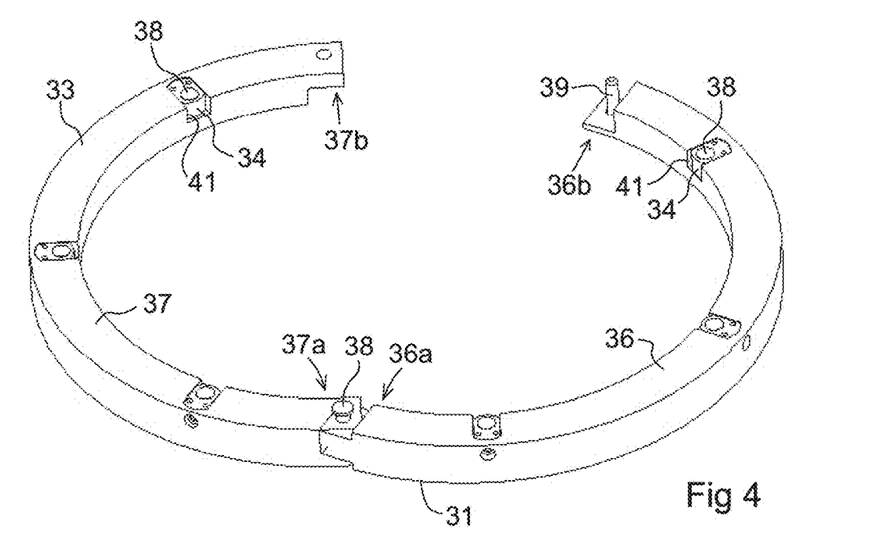
FIG. 4 is a perspective view from below of the hydraulic tool of FIG. 2, as seen with the ring-shaped frame in an open position.

At an offshore well for oil and gas exploitation, a conduit 1 in the form of a production riser may be connected to a subsea wellhead assembly 2 by means of a tieback connector 3 of the type illustrated in FIG. 1. The illustrated tieback connector 3 is a known type of tieback connector which is not provided with any internal hydraulic cylinders and which is securable to and releasable from a wellhead assembly by means of a separate running and retrieval tool 4. The tieback connector 3 comprises a connector body 5 which is bolted to the lower end of the conduit 1. When the lower part of the connector body 5 has been lowered down over the upper end of the wellhead assembly 2, the tieback connector 3 may be secured to the wellhead assembly 2 by means of the running and retrieval tool 4. The tieback connector 3 comprises a number of latching dogs 6 which are moveably mounted in the connector body 5 so as to be moveable in the radial direction between a retracted unlocking position, in which the connector body 5 is allowed to move axially in relation to the wellhead assembly 2, and an advanced locking position, in which grooves on the inner side of each dog 6 is in engagement with external grooves 7 on the wellhead assembly 2 and thereby prevents the connector body 5 from moving axially in relation to the wellhead assembly 2. Each dog 6 has a tapered wedge surface 8 on its outer side, which is in engagement with a corresponding wedge surface 9 on the inner side of a cam ring 10. The cam ring 10 is fixed to an actuation ring 11 via a number of connecting rods 12. The cam ring 10 and the actuation ring 11 are displaceably mounted to the connector body 5. The running and retrieval tool 4 comprises an annular actuation member 13 and a number of hydraulic cylinders 14, by means of which the actuation member 13 may be moved in the axial direction. When the tieback connector 3 is to be secured to the wellhead assembly 2, the actuation member 13 is brought into engagement with the actuation ring 11, whereupon the hydraulic cylinders 14 are actuated to press the actuation member 13 axially downwards against the actuation ring 11 so as to thereby move the cam ring 10 downwards along the dogs 6. The cam ring 10 will thereby press the dogs 6 radially inwards into engagement with the external grooves 7 on the wellhead assembly 2, as illustrated in FIG. 1. The running and retrieval tool 4 may then be released from the tieback connector 3 and retrieved to the surface. The dogs 6 are maintained in the advanced locking position by the frictional grip between the wedge surface 9 on the cam ring 10 and the wedge surface 8 on the dogs 6. When the tieback connector 3 is to be released from the wellhead assembly 2, the running and retrieval tool 4 is again mounted to the tieback connector 3 and the actuation member 13 is secured to the actuation ring 11 by means of pivotable gripping members 15 on the actuation member 13 which are engaged with a flange 16 on the actuation ring 11. Thereafter, the hydraulic cylinders 14 are actuated to pull the actuation member 13 and the actuation ring 11 axially upwards so as to thereby move the cam ring 10 upwards along the dogs 6 and allow the dogs to move radially outwards into the retracted unlocking position, whereupon the tieback connector 3 may be lifted vertically away from the wellhead assembly 2. However, the frictional grip between the cam ring 10 and the dogs 6 grows stronger and stronger in course of time and could after some years be so strong that the force required for pulling the actuation ring 11 in order to release the cam ring 10 from the dogs 6 is so high that the flange 16 on the actuation ring 11 will be damaged by the gripping members 15 when the hydraulic cylinders 14 are actuated to effect the required pulling force.

A hydraulic tool is known from U.S. Pat. No. 5,273,376 A. This known tool comprises an essentially U-shaped frame which carries hydraulic cylinders. The U-shaped frame is to be inserted into a gap between a riser and a well assembly, whereupon the hydraulic cylinders are pressurized in order to separate the riser from the well assembly.

SUMMARY OF THE INVENTION

The object of embodiments of the present invention is to provide a new hydraulic tool of the above-mentioned type, which in at least some aspect offers an advantage as compared to previously known hydraulic tools of this type.

According to embodiments of the invention, a hydraulic tool is provided. The hydraulic tool comprises: a frame which is configured for insertion into a gap between an annular shoulder on a first structural element and an annular shoulder on a second structural element; and a number of hydraulic power members which are fixed to and distributed along said frame, the power members being configured to exert an axial pushing force against one of said annular shoulders to thereby move said structural elements apart.

The frame is ring-shaped and comprises a first arc-shaped section and a second arc-shaped section, each one of these arc-shaped sections having a hinged first end and an opposite second end. Said arc-shaped sections are pivotable in relation to each other between an open position, in which the second end of the first arc-shaped section and the second end of the second arc-shaped section are spaced apart, and a closed position, in which the second end of the first arc-shaped section is in contact with the second end of the second arc-shaped section. Hereby, the frame may extend all around the centre axis of the two structural elements that are to be separated from each other. The hydraulic power members are evenly distributed around the centre axis of the two structural elements that are to be separated from each other and by using a ring-shaped frame it will be possible to provide a larger number of hydraulic power members on the frame as compared to a U-shaped frame. By increasing the number of hydraulic power members, the maximum force that can be exerted by the hydraulic tool is increased.

Additional features of the hydraulic tool of the present invention will appear from the following description.

Embodiments of the invention also relate to a method for releasing the frictional grip between a cam ring and a number of dogs which are moveably mounted in a connector body of a tieback connector.

BRIEF DESCRIPTION OF THE DRAWINGS

With reference to the appended drawings, a specific description of the embodiments of the invention cited as examples follows below. In the drawings.

DETAILED DESCRIPTION

A hydraulic tool 30 according to two different embodiments of the present invention is shown in FIGS. 2-7. The hydraulic tool 30 is to be used for moving a first structural element in the axial direction in relation to a second structural element. In the examples illustrated in FIGS. 8-11, the hydraulic tool 30 is used for pushing an actuation ring 11 of a tieback connector 3 in the axial direction away from an annular shoulder 17 on a connector body 5 of the tieback connector. Thus, in this case the actuation ring 11 constitutes said first structural element, whereas the connector body 5 constitutes said second structural element. However, the hydraulic tool 30 could also be used in other applications where there is a need to push a first structural element in the axial direction in relation to a second structural element.

The hydraulic tool 30 comprises a ring-shaped frame 31 which is configured for insertion into a gap between an annular shoulder 18 on the first structural element 11 and an opposite annular shoulder 17 on the second structural element 5. The frame 31 has an upper side 32, which is intended to face the annular shoulder 18 on the first structural element 11, and an opposite lower side 33, which is intended to face the annular shoulder 17 on the second structural element 5. A number of hydraulic power members 34, in the form of compact hydraulic cylinders, are fixed to and distributed along the frame 31. The hydraulic power members 34 are evenly distributed around the centre of the frame 31, i.e. the hydraulic power members 34 are equally spaced in the circumferential direction of the frame 31. The hydraulic power members 34 are configured to exert an axial pushing force against one of said annular shoulders 17, 18 to thereby move said structural elements 5, 11 apart. The hydraulic power members 34 may be fixed to the frame 31 by screws.

The frame 31 comprises a first arc-shaped section 36 and a second arc-shaped section 37. Each one of these arc-shaped sections 36, 37 has a hinged first end 36a, 37a and an opposite second end 36b, 37b. In the illustrated embodiment, the arc-shaped sections 36, 37 are semicircular, the first end 36a of the first arc-shaped section 36 being hinged directly to the first end 37a of the second arc-shaped section 37 through a pivot 38. As an alternative, the arc-shaped sections 36, 37 may be hinged to an intermediate connecting member located between the first end 36a of the first arc-shaped section 36 and the first end 37a of the second arc-shaped section 37.

The arc-shaped sections 36, 37 are pivotable in relation to each other between an open position (see FIG. 4), in which the second end 36b of the first arc-shaped section 36 and the second end 37b of the second arc-shaped section 37 are spaced apart, and a closed position (see FIGS. 2, 3, 6 and 7), in which the second end 36b of the first arc-shaped section 36 is in contact with the second end 37b of the second arc-shaped section 37. When the arc-shaped sections are in the closed position, the second end 36b of the first arc-shaped section 36 may be locked to the second end 37b of the second arc-shaped section 37 by means of a locking member 39, for instance in the form of locking pin.

Each arc-shaped section 36, 37 is provided with at least two hydraulic power members 34, at least three hydraulic power members 34. In the illustrated embodiment, each arc-shaped section 36, 37 is provided with three hydraulic power members 34. Each hydraulic power member 34 comprises a hydraulically actuated plunger 40, which is moveable in the axial direction of the frame 31. Each hydraulic power member 34 is located in a recess 41 in the frame 31.

Figure 5:
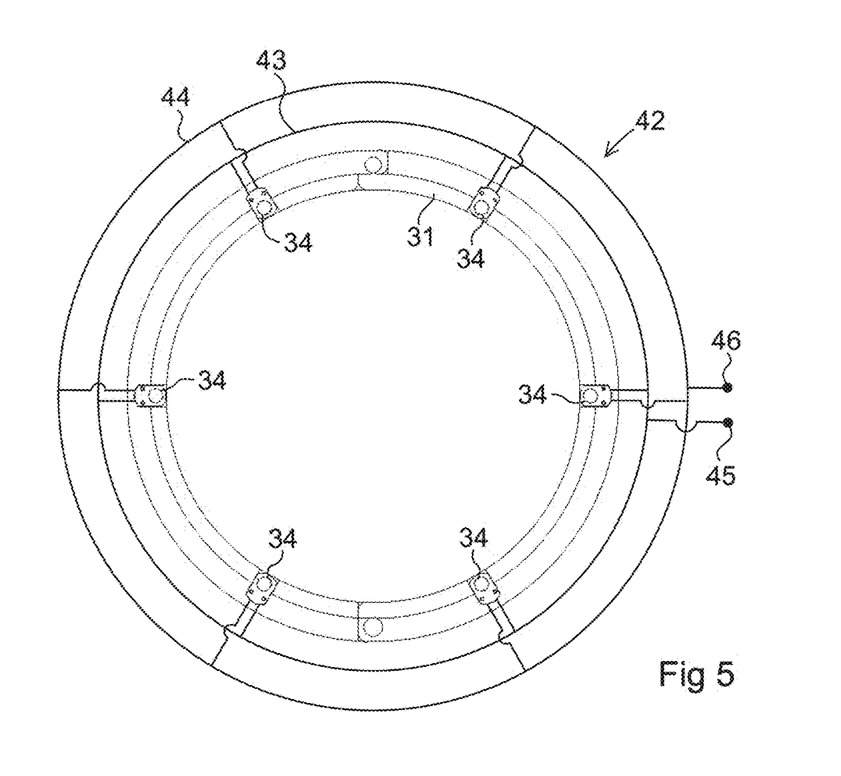
FIG. 5 is a schematic illustration of a hydraulic system included in the hydraulic tool of FIG. 2.

Each hydraulic power member 34 is connected to a hydraulic circuit 42 arranged in the frame 31, as schematically illustrated in FIG. 5. In the illustrated example, the hydraulic circuit 42 comprises a supply line 43 for supplying pressurized hydraulic fluid to the hydraulic power members 34 and a return line 44 for returning hydraulic fluid from the hydraulic power members 34. The supply line 43 is connected to an inlet port 45 and the return line 44 is connected to an outlet port 46. The supply line 43 and return line 44 are integrated in the frame 31.

Figure 9:
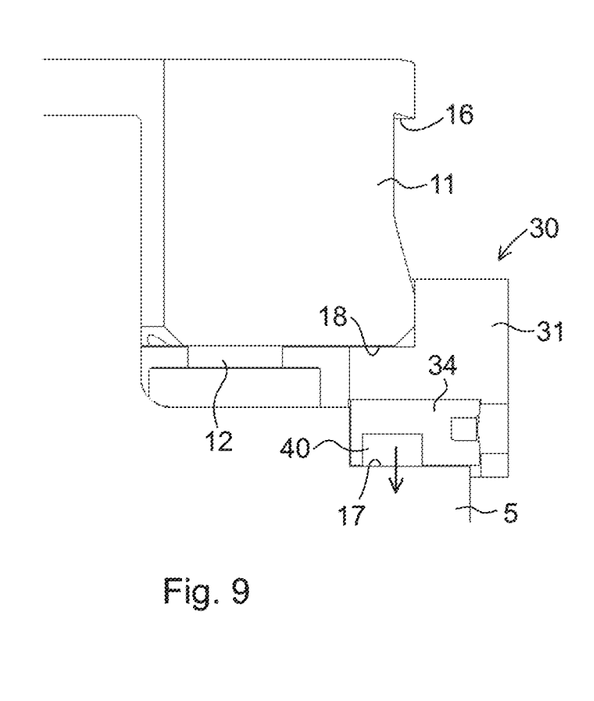
FIG. 9 is a detail enlargement according to the square IX in FIG. 8.
Figure 10:
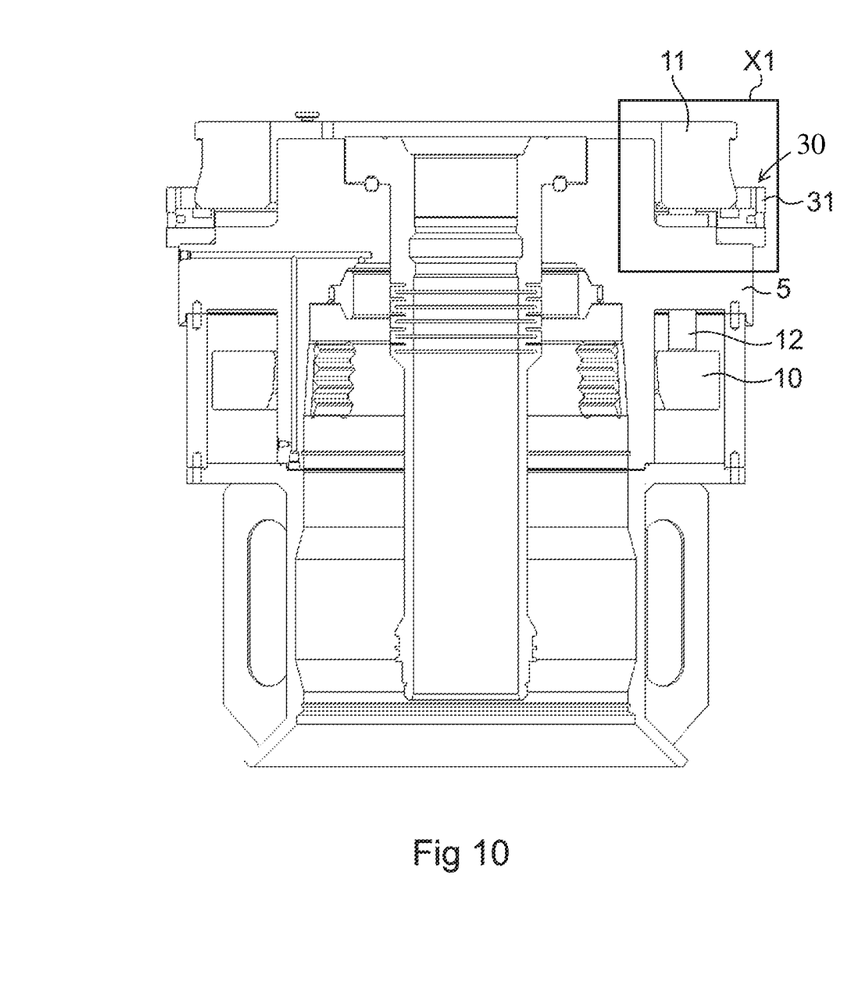
FIG. 10 is a vertical section through the hydraulic tool of FIG. 6 inserted into a gap between an actuation ring and a connector body of a tieback connector.

In the embodiment illustrated in FIGS. 2-5, each hydraulic power member 34 is located in a recess 41 on the lower side 33 of the frame 31. Thus, the plungers 40 are in this case configured to press against the annular shoulder 17 on the second structural element 5, as illustrated in FIG. 9.

Figure 6:
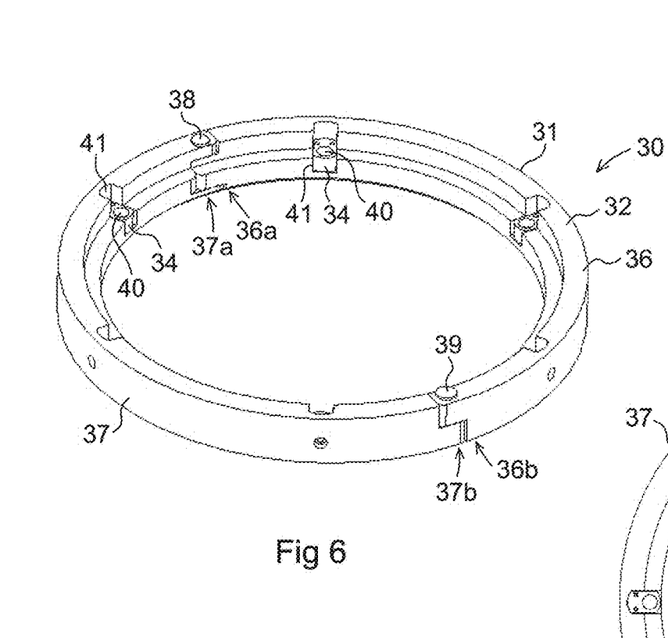
FIG. 6 is a perspective view from above of a hydraulic tool according to a second embodiment of the present invention, as seen with the ring-shaped frame of the hydraulic tool in a closed position.
Figure 7:
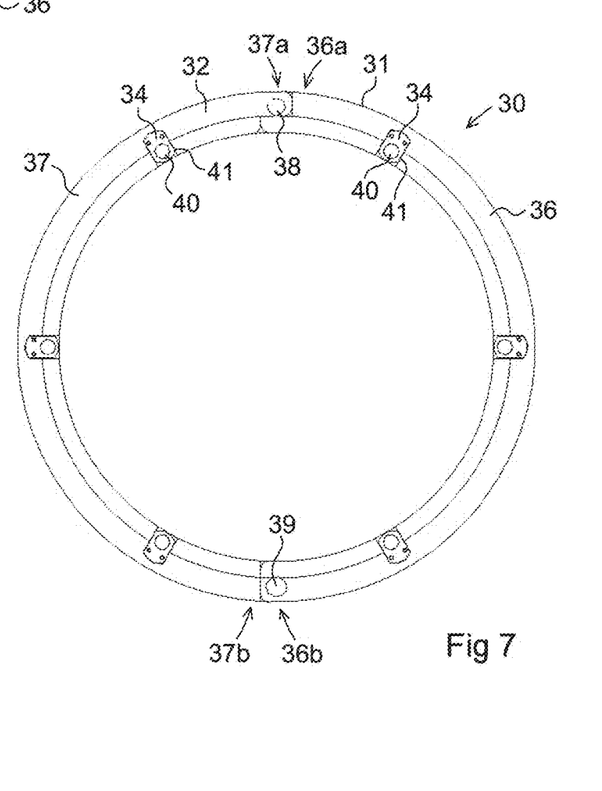
FIG. 7 is a planar view from above of the hydraulic tool of FIG. 6.
Figure 8:
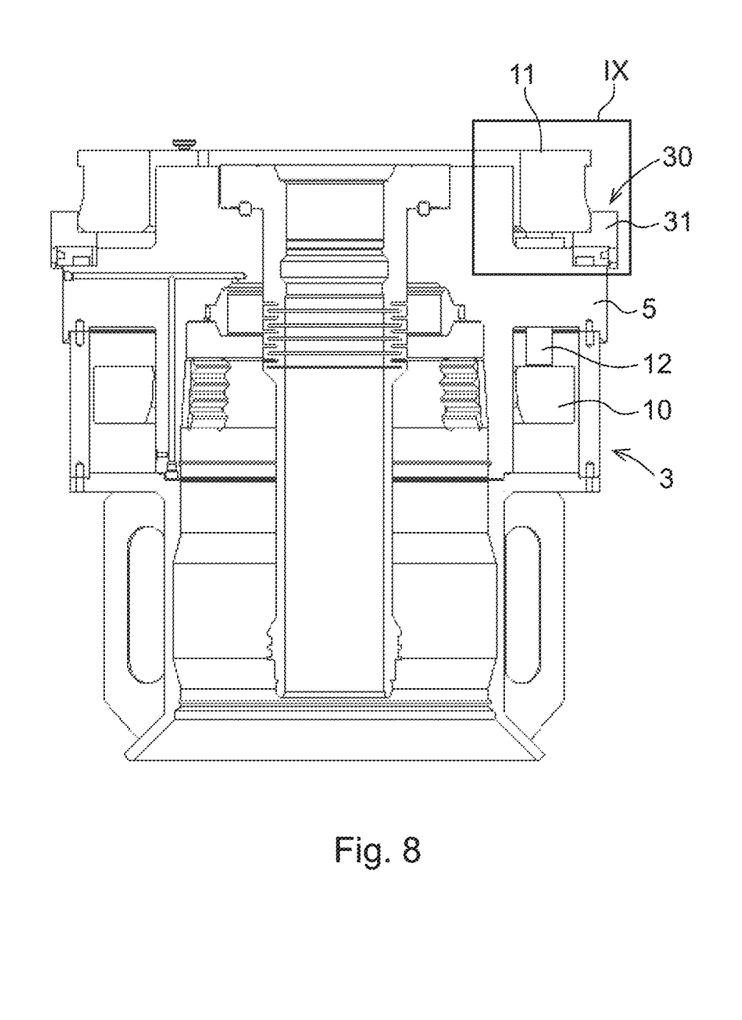
FIG. 8 is a vertical section through the hydraulic tool of FIG. 2 inserted into a gap between an actuation ring and a connector body of a tieback connector.
Figure 11:
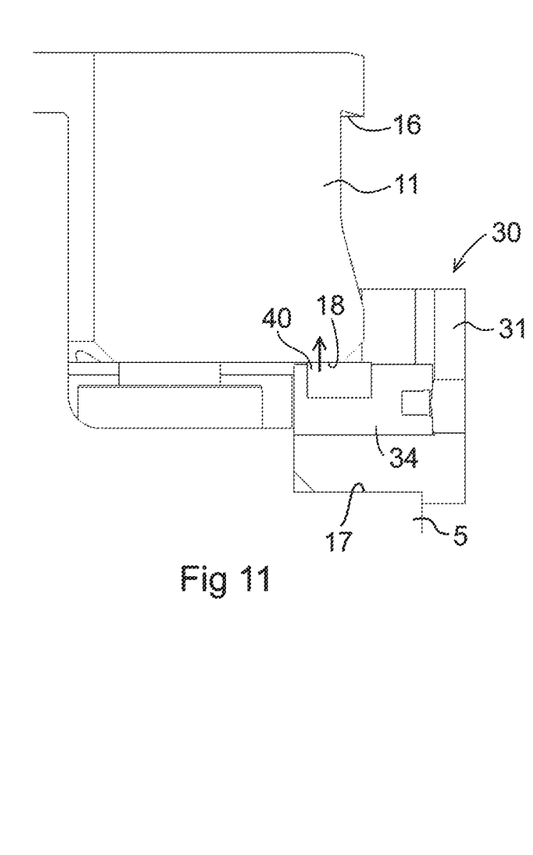
FIG. 11 is a detail enlargement according to the square XI in FIG. 10.

In the embodiment illustrated in FIGS. 6 and 7, each hydraulic power member 34 is located in a recess 41 on the upper side 32 of the frame 31. Thus, the plungers 40 are in this case configured to press against the annular shoulder 18 on the first structural element 11, as illustrated in FIG. 11.

When the hydraulic tool 30 is to be used in order to release the frictional grip between the cam ring 10 and the latching dogs 6 of a tieback connector 3 of the type illustrated in FIGS. 1 and 8-11, the ring-shaped frame 31 of the hydraulic tool 30 is inserted into the gap between the annular shoulder 18 on the actuation ring 11 and the opposite annular shoulder 17 on the connector body 5 of the tieback connector 3. This is accomplished by means of an ROV (ROV=Remotely Operated Vehicle) which is connected to the hydraulic tool 30. The first and second arc-shaped sections 36, 37 of the frame 31 are held in the open position when the frame is inserted into said gap. Thereafter, the first and second arc-shaped sections 36, 37 of the frame 31 are pivoted in relation to each other from the open position to the closed position. The hydraulic tool 30 may then be disconnected from the ROV. The hydraulic power members 34 are then pressurized, either by using an umbilical running from the surface or by means of hydraulic equipment on the ROV, in order to actuate the plungers 40 of the hydraulic power members 34 and thereby push the actuation ring 11 in the axial direction away from the annular shoulder 17 on the connector body 5. The cam ring 10 will move in the axial direction together with the actuation ring 11 and the frictional grip between the cam ring 10 and the dogs 6 is thereby released. When the frictional grip between the cam ring 10 and the dogs 6 has been released, the first and second arc-shaped sections 36, 37 of the frame 31 are pivoted in relation to each other from the closed position to the open position and the hydraulic tool 30 is removed from the tieback connector 3 by means of the ROV. Thereafter the running and retrieval tool 4 is mounted to the tieback connector 3 and the actuation member 13 of the running and retrieval tool 4 is secured to the actuation ring 11 by means of the gripping members 15 on the actuation member 13. Thereafter, the hydraulic cylinders 14 of the running and retrieval tool 4 are actuated to pull the actuation member 13 and the actuation ring 11 axially upwards so as to thereby move the cam ring 10 upwards along the dogs 6 and allow the dogs to move radially outwards into the retracted unlocking position, whereupon the tieback connector 3 may be lifted vertically away from the wellhead assembly 2.

The invention is of course not in any way restricted to the embodiments described above. On the contrary, many possibilities to modifications thereof will be apparent to a person with ordinary skill in the art without departing from the basic idea of the invention such as defined in the appended claims.

What is claimed is:

1. A hydraulic tool for moving a first structural element in an axial direction in relation to a second structural element, wherein the first structural element comprises an annular shoulder which faces an opposite annular shoulder on the second structural element, the hydraulic tool comprising:
    a frame configured to be inserted into a gap between the annular shoulder on the first structural element and the annular shoulder on the second structural element, the frame comprising an upper side and an opposite lower side; and
    a plurality of hydraulic power members fixed to and distributed along the frame, the power members configured to exert an axial pushing force against one of the annular shoulders to thereby move the structural elements apart,
    wherein:
        the frame is ring-shaped and further comprises a first arc-shaped section and a second arc-shaped section, each one of the arc-shaped sections comprising a hinged first end and an opposite second end; and
        the arc-shaped sections are pivotable in relation to each other between an open position, in which the second end of the first arc-shaped section and the second end of the second arc-shaped section are spaced apart, and a closed position, in which the second end of the first arc-shaped section is in contact with the second end of the second arc-shaped section.

2. The hydraulic tool according to claim 1, wherein the first end of the first arc-shaped section is hinged to the first end of the second arc-shaped section.

3. The hydraulic tool according to claim 2, wherein each one of the arc-shaped sections comprises at least two hydraulic power members.

4. The hydraulic tool according to claim 3, wherein each hydraulic power member is located in a recess in the frame.

5. The hydraulic tool according to claim 4, wherein each hydraulic power member is connected to a hydraulic circuit arranged in the frame.

6. The hydraulic tool according to claim 5, wherein the hydraulic tool further comprises a locking member configured to lock the second end of the first arc-shaped section to the second end of the second arc-shaped section when the arc-shaped sections are in the closed position.

7. The hydraulic tool according to claim 2, wherein each hydraulic power member is located in a recess in the frame.

8. The hydraulic tool according to claim 7, wherein each hydraulic power member is connected to a hydraulic circuit arranged in the frame.

9. The hydraulic tool according to claim 2, wherein each hydraulic power member is connected to a hydraulic circuit arranged in the frame.

10. The hydraulic tool according to claim 2, wherein the hydraulic tool further comprises a locking member configured to lock the second end of the first arc-shaped section to the second end of the second arc-shaped section when the arc-shaped sections are in the closed position.

11. The hydraulic tool according to claim 1, wherein each one of the arc-shaped sections comprises at least two hydraulic power members.

12. The hydraulic tool according to claim 1, wherein each one of the arc-shaped sections comprises at least three hydraulic power members.

13. The hydraulic tool according to claim 1, wherein each hydraulic power member is located in a recess in the frame.

14. The hydraulic tool according to claim 13, wherein each hydraulic power member is located in the recess on the lower side of the frame.

15. The hydraulic tool according to claim 13, wherein each hydraulic power member is located in the recess on the upper side of the frame.

16. The hydraulic tool according to claim 1, wherein each hydraulic power member is connected to a hydraulic circuit arranged in the frame.

17. The hydraulic tool according to claim 1, wherein each hydraulic power member is a hydraulic cylinder.

18. The hydraulic tool according to claim 1, wherein the hydraulic tool further comprises a locking member configured to lock the second end of the first arc-shaped section to the second end of the second arc-shaped section when the arc-shaped sections are in the closed position.

19. The hydraulic tool according to claim 1, wherein the arc-shaped sections are semicircular.

20. A method for releasing the frictional grip between a cam ring and a number of latching dogs moveably mounted in a connector body of a tieback connector which is fixed to a wellhead assembly by the engagement of the dogs in external grooves on the wellhead assembly, wherein the dogs are wedged to the wellhead assembly by the cam ring and the cam ring is fixed to an axially moveable actuation ring of the tieback connector, the method comprising:
    inserting the ring-shaped frame of a hydraulic tool into a gap between an annular shoulder on the actuation ring and an opposite annular shoulder on the connector body, wherein a first and second arc-shaped sections of the frame are held in an open position when the frame is inserted into the gap;
    pivoting the first and second arc-shaped sections of the frame in relation to each other from the open position to a closed position; and
    pressurizing hydraulic power members provided on the frame in order to push the actuation ring in the axial direction away from the annular shoulder on the connector body and thereby releasing the frictional grip between the cam ring and the dogs.

\* \* \* \* \*